United States Patent
Miller

[11] Patent Number: 5,975,022
[45] Date of Patent: Nov. 2, 1999

[54] AQUARIUM CLEANING DEVICE

[76] Inventor: Jeffrey S. Miller, 1011 Michigan Ave., LaPorte, Ind. 46350-3506

[21] Appl. No.: 08/992,225

[22] Filed: Dec. 17, 1997

Related U.S. Application Data

[60] Provisional application No. 60/042,084, Mar. 28, 1997.

[51] Int. Cl.[6] .............................. A01K 63/04; B08B 1/00
[52] U.S. Cl. ..................... 119/264; 210/169; 15/104.096
[58] Field of Search ................................. 119/264; 15/34, 15/304, 61, 65, 59, 104.09, 104.095, 104.096; 210/169

[56] References Cited

U.S. PATENT DOCUMENTS

| | | |
|---|---|---|
| 508,380 | 11/1893 | Gardner . |
| 925,909 | 6/1909 | Heywang, Jr. et al. . |
| 2,693,611 | 11/1954 | Lombardi .............................. 15/104.09 |
| 2,769,191 | 11/1956 | Hunt et al. .............................. 15/104.3 |
| 2,899,063 | 8/1959 | Ellis, Jr. ..................................... 210/169 |
| 3,734,853 | 5/1973 | Horvath ..................................... 210/169 |
| 4,117,044 | 9/1978 | Durda et al. ................................ 261/30 |
| 4,272,372 | 6/1981 | Fonseca .................................... 210/169 |
| 4,615,802 | 10/1986 | Harbaugh ................................. 210/169 |
| 4,913,811 | 4/1990 | Huang et al. ............................. 210/169 |
| 5,048,140 | 9/1991 | Wu .............................................. 15/1.7 |
| 5,226,207 | 7/1993 | Elzaurdia .............................. 15/104.31 |
| 5,240,596 | 8/1993 | Chestnut .................................. 210/136 |
| 5,279,730 | 1/1994 | Chen ....................................... 210/169 |
| 5,636,400 | 6/1997 | Young ......................................... 15/23 |
| 5,636,403 | 6/1997 | Grimsley et al. .................. 15/104.095 |
| 5,655,245 | 8/1997 | Bunch ......................................... 15/1.7 |
| 5,706,539 | 1/1998 | Fukuda ........................................ 15/1.7 |

*Primary Examiner*—Robert P. Swiatek
*Assistant Examiner*—Yvonne R. Abbott
*Attorney, Agent, or Firm*—Baker & Daniels

[57] ABSTRACT

A device for cleaning and removing debris from aquariums includes a tubular housing defining a chamber, a rotating shaft extending through the chamber and protected from an end thereof, an agitating brush mounted on the end of the shaft. A power source, such as a portable electric screw driver, is connected to the other end of the shaft for rotating the agitator to dislodge debris from the aquarium. A siphon tube is communicated with the chamber and draws water, with the debris enframed therein, into the chamber and then to a siphon tube for filtering and disposal.

12 Claims, 5 Drawing Sheets

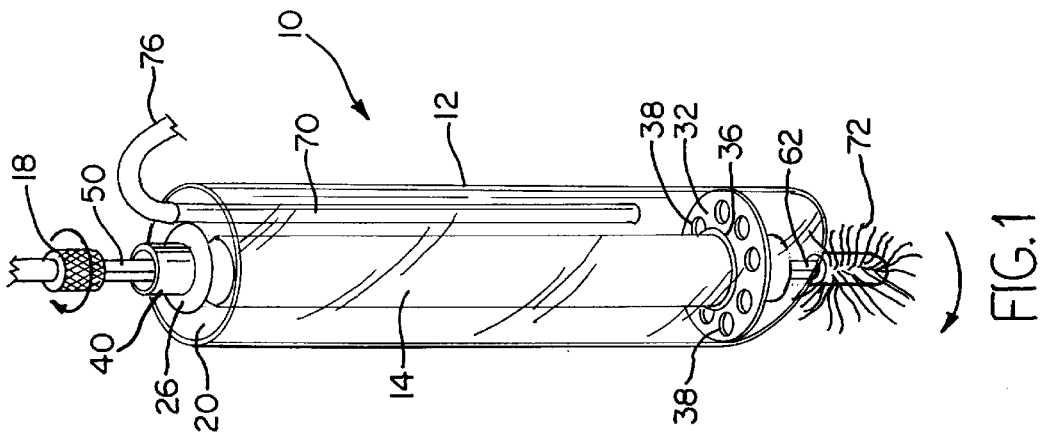
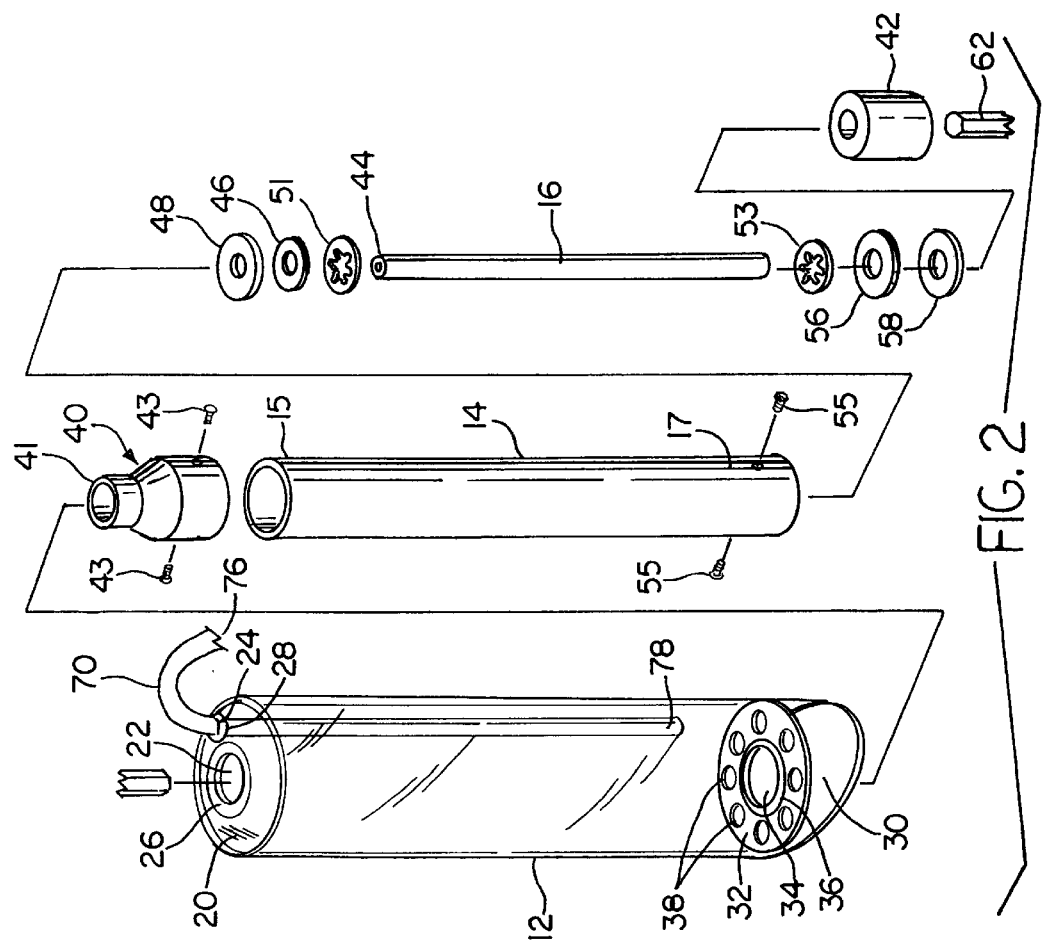

AQUARIUM CLEANING DEVICE

This application claims benefit of Provisional Application Ser. No. 60/042,084 filed Mar. 28, 1997.

The present invention relates to an aquarium cleaning device having a rotating scrub brush in combination with a vacuum/siphon tube assembly. The cleaning device is driven by a hand held cordless screw driver.

BACKGROUND AND SUMMARY OF THE INVENTION

Aquarium owners have long been familiar with the problem of dirty aquariums. The glass walls and the gravel at the bottom of the tank offer convenient collection points for dirt, debris, algae, decayed food and other contaminants. In order to ensure that the aquarium environment is safe for the fish, these contaminants need to be dislodged and removed on a regular basis. However, the aquarium must be cleaned without contaminating all of the water.

In the past, the walls of the aquariums were cleaned by scrubbing the glass using hand-held pads, brushes, sponges, mitts or scrapers, while the gravel was typically cleaned by agitating the gravel with similar instruments to dislodge the contaminants. Oftentimes these devices were attached to long handles for extended reach. In order to prevent the dislodged dirt, debris, etc., from contaminating the water and harming the fish, the dirty water needed to be removed from the aquarium. Thus, a siphon tube was typically used to draw the contaminated water out of the tank. The contaminated water was then disposed of or filtered and recycled back into the aquarium. Many times, the siphon tube itself was used to agitate and manipulate the gravel, although this method resulted in very inefficient cleaning.

Despite precautions, each of the above described methods usually releases a large quantity of contaminants into the water, which makes the water extremely cloudy, creates a safety hazard for the fish in the tank, overloads the filtering system, and interferes with the cleaning process. Accordingly, there exists a need for an aquarium cleaning device that quickly and efficiently cleans the walls, the gravel, and other aquarium components, without releasing an appreciable quantity of contaminants into the water.

The aquarium cleaning device according to the present invention uses a rotating scrub brush or agitator which is driven by a hand held cordless screw driver. The rotating brush allows the aquarium owner to clean the aquarium in a fraction of the time than was possible with prior art methods. Also, the rotating brush mechanism fits inside a siphon tube so that the loosened contaminants are confined to the interior of the siphon tube where they can be quickly and easily drawn out for disposal or filtering. Thus, the aquarium water is less cloudy during the cleaning process, which makes it easier to clean the aquarium, and potential harm to the fish is minimized. The rotating brush assembly has a central rotating drive shaft surrounded by an elongated tube. One end of the drive shaft is provided with a drive bit which is adapted to be connected to any commercially available hand held cordless screwdriver. The brush or agitator attachment is secured to the opposite end of the drive shaft. The tube and brush assembly are positioned inside a siphon tube so that the drive bit protrudes from one end of the siphon tube while the rotating brush or agitator protrudes from the opposite end of the siphon tube. The brush or agitator is rotated by the cordless screw driver attached to the bit.

The majority of the contaminants dislodged by the brush are confined to the interior of the siphon tube by a siphon hose connected to the siphon tube, which continuously draws water through the siphon tube, thereby removing the cloudy, contaminated water from the aquarium. The water may be either filtered and re-routed into the aquarium or disposed of. To clean gravel, a separate agitator attachment may be used in place of the brush. In one embodiment of the invention, an impeller attached to the rotating shaft draws water out of the siphon tube. Thus, the present invention allows the user to quickly and effectively clean aquariums without contaminating the aquarium water and harming the fish.

Accordingly, it is an object of this invention to provide an aquarium cleaning device that can be used to quickly and effectively clean aquariums. Another object of this invention is to provide an aquarium cleaning device that has a brush or agitator attachment secured to a rotating drive shaft, all of which is housed in a siphon tube.

Another object of this invention is to provide an aquarium cleaning device that confines the loosened dirt, debris, and other contaminants to a confined area thus preventing the debris from contaminating the rest of the aquarium.

Still another object of this invention is provide an aquarium cleaning device that prevents debris from being distributed around the aquarium.

These and other objects of the invention will become evident upon a reading of the following detailed description.

BRIEF DESCRIPTION OF THE DRAWINGS

FIG. 1 is a perspective view of the aquarium cleaning device according to the present invention;

FIG. 2 is an exploded view in perspective of the aquarium cleaning device shown in FIG. 1;

DETAILED DESCRIPTION OF THE INVENTION

The embodiment herein described is not intended to be exhaustive or to limit the invention to the precise form disclosed. It is chosen and described to explain the principles of the invention and its application and practical use to best enable others skilled in the art to follow its teachings.

Figure 3:
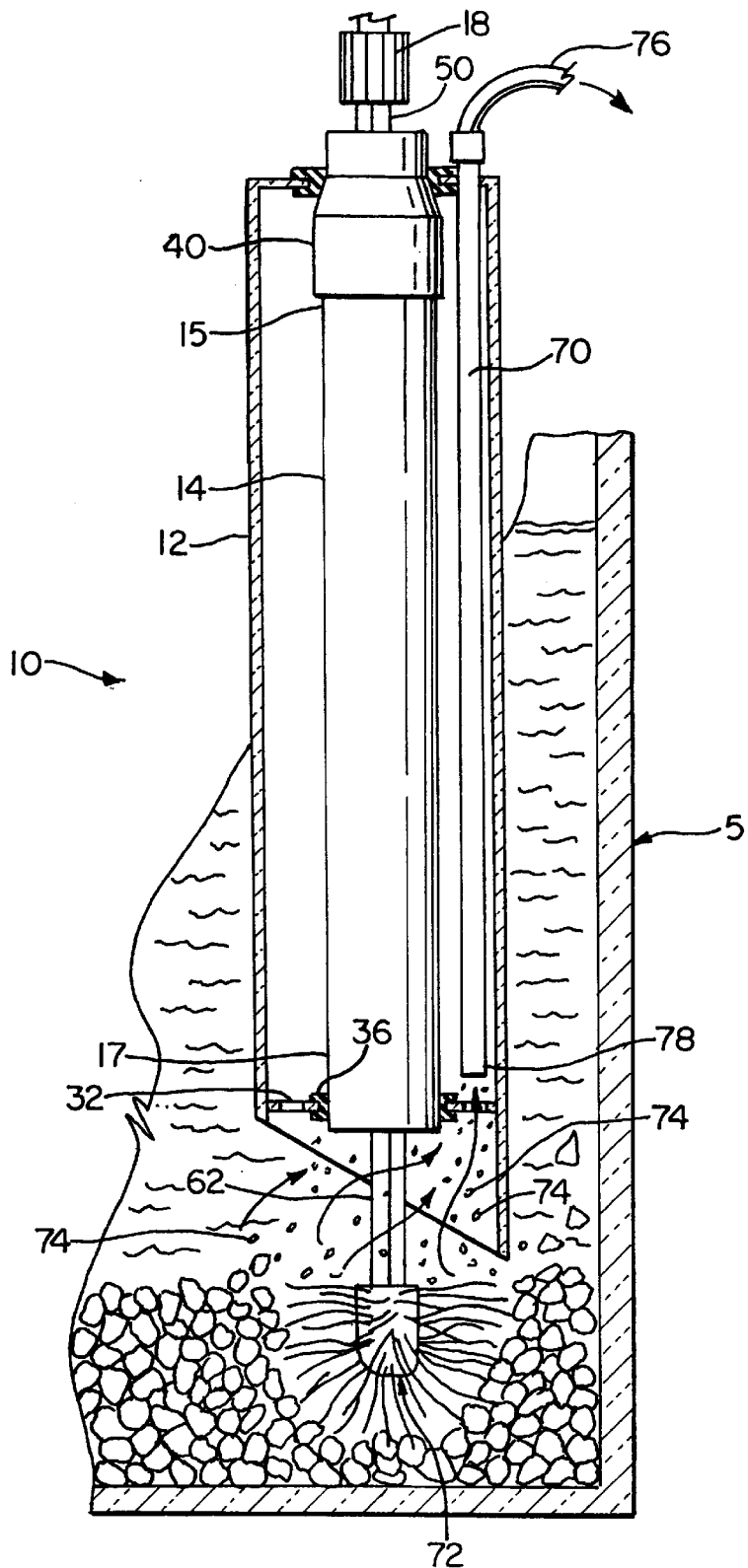
FIG. 3 is a fragmentary elevational view, partly in section, of the aquarium cleaning device shown in FIGS. 1 and 2 shown being used to clean an aquarium.

Referring now to the drawings, an aquarium cleaning device according to the present invention is generally indicated by the reference numeral 10. Cleaner 10 includes a cylindrical outer housing 12, a cylindrical inner housing 14 and a drive shaft assembly 16 which is disposed within inner housing 14. Inner housing 14 is in turn disposed within outer housing 12 as discussed in greater detail below. Cleaner 10 is adapted to be driven by the rotating chuck assembly 18 of a common hand held cordless screwdriver or similar device (not shown). Outer housing 12 is preferably formed from a clear plexiglass or similar material, and includes a top surface 20 having a primary opening 22 located in the center of top surface 20, and a secondary opening 24 located to the side of top surface 20. Openings 22, 24 each include a rubber grommet 26, 28, respectively. The lower end of housing 12 includes a bottom opening 30. The lower end of outer housing 12 is preferably slanted as shown in FIG. 3. A guide plate 32 is disposed within the lower end of outer housing 12 just inside bottom opening 30. Guide plate 32 includes a primary opening 34 surrounded by a grommet 36 and a plurality of secondary openings 38.

Inner housing 14 includes an upper cap 40 and a lower plug 42. A drive shaft assembly 16 is rotatably disposed within inner housing 14. As shown in FIG. 3a, the lower end of cap 40 is secured to the upper end 15 of inner housing 14. The upper end 44 of drive shaft 16 abuts washer 46 which fits inside the upper end 15 of housing 14, and a second washer 48 abuts the upper end 15 of housing 14. Cap 40 holds washers 48, 46 in place along with the upper end 44 of drive shaft 16, and cap 40 is secured in place by fasteners 43. Alternatively, cap 40 may be held in place by a commercially available water proof adhesive. A hexagonal bit 50 is secured within the upper end 44 of drive shaft 16 such as by gluing, bonding, or similar means, so that the drive end 52 of bit 50 protrudes from cap 40. Alternatively, bit 50 can be secured to shaft 16 by using an internal star washer 51, which is heated and placed on shaft 16 after bit 50 has been placed in the end of shaft 16. When the washer 51 cools, it shrinks and thus secures bit 50 within shaft 16.

Figure 3B:
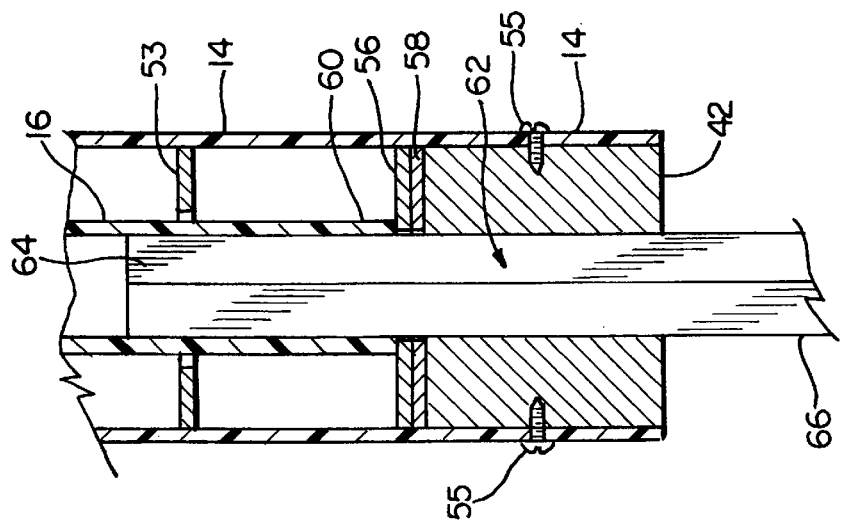
FIG. 3b is an enlarged fragmentary view in section of the bottom portion of the aquarium cleaning device showing the lower plug assembly and the drive bit secured to the drive shaft.
Figure 3A:
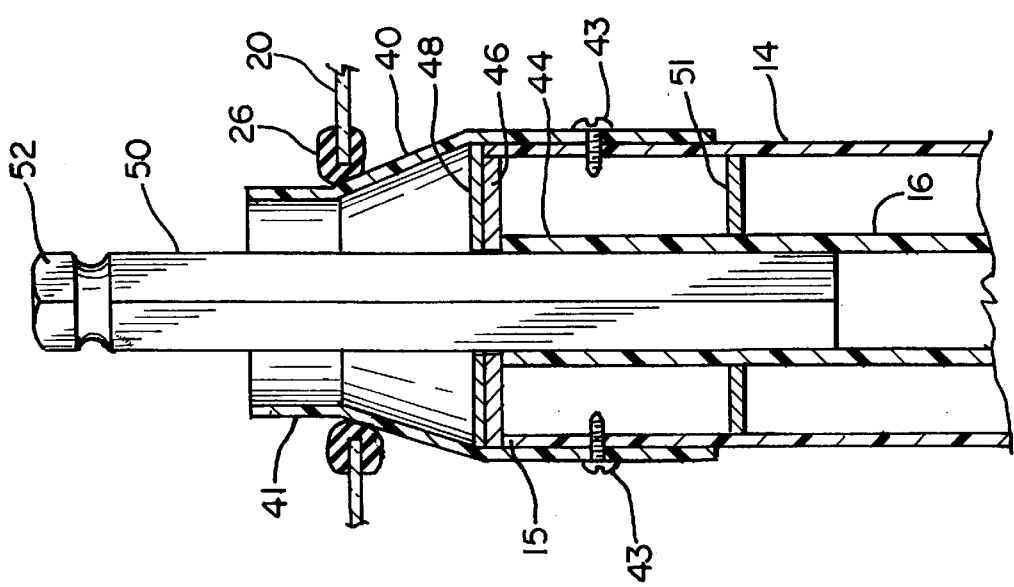
FIG. 3a is an enlarged fragmentary view in section of the top portion of the aquarium cleaning device showing the upper cap assembly and the drive bit secured to the drive shaft.

As shown in FIG. 3b, plug 42 fits within the lower end of inner housing 14, and a pair of washers or bushings 56, 58 abut the lower end 60 of drive shaft 16. Plug 42 is secured in place by fasteners 55, or by a commercially available waterproof adhesive. Hexagonal bit 62 includes an upper end 64 which is glued, bonded or otherwise secured within the lower end 60 of drive shaft 16 so that the lower end 66 of bit 62 protrudes through the end of plug 42. Alternatively, bit 62 can be secured to shaft 16 by using an internal star washer 53, which is heated and placed on shaft 16 after bit 62 has been placed in the end of shaft 16. When the washer 53 cools, it shrinks and thus secures bit 62 to shaft 16. Thus, any rotation of drive bit 50 in turn rotates drive shaft 16 which rotates bit 62 at the lower end of the device 10.

Figure 7:
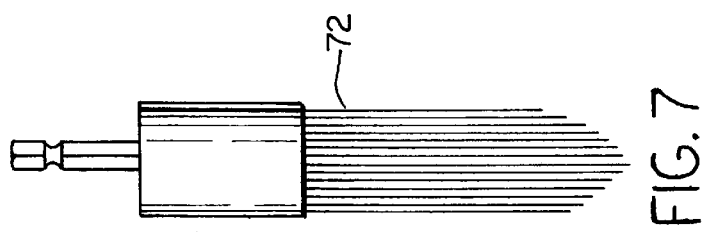
FIG. 7 is an elevational view of a scrub brush attachment for use with the present invention.

As show in FIGS. 1–3, a siphon tube 70 is inserted through aperture 24 in sealing engagement with grommet 28. The suction end 78 of the siphon tube 70 extends within outer housing 12 towards the lower end of outer housing 12. The inner housing 14 having the drive shaft assembly 16 installed therein is sized to be received within outer housing 12 as shown in FIGS. 1 and 3 with cap 40 protruding through upper surface 20, and with guide plate 32 holding the upper end 15 of inner housing 14 in place through aperture 34. Upper end 41 of cap 40 fits within aperture 22 in sealing engagement with grommet 26 as shown in FIG. 3a, while lower end 17 of outer housing 14 fits within aperture 34 of guide plate 32 in sealing engagement with grommet 36. A shown in FIGS. 1, 3 and 4, a brush assembly 72 snaps onto the lower end 66 of hexagonal bit 62. The size and shape of the brush assembly 72 may vary from that shown in FIGS. 1, 3 or 4 to that shown in FIG. 7 depending on the type of area to be cleaned.

In operation, a brush assembly 72 is attached to bit 62 at the lower end of cleaner 10, and a hand held cordless screw driver or similar means (not shown) having a chuck assembly 18 is secured to bit 50 at the upper end of cleaner 10. As shown in FIG. 3, when the device is inserted into an aquarium 5, the rotation of brush 72 dislodges dirt, debris and other contaminants 74. Suction applied to end 76 of suction tube 70 causes water and suspended contaminants 74 to flow through the secondary holes 38 of guide plate 32 into the interior of housing 12. The contaminants 74 are then sucked into the suction end 78 of siphon tube 70 and out of the cleaner 10 for disposal or filtering.

Figure 4:
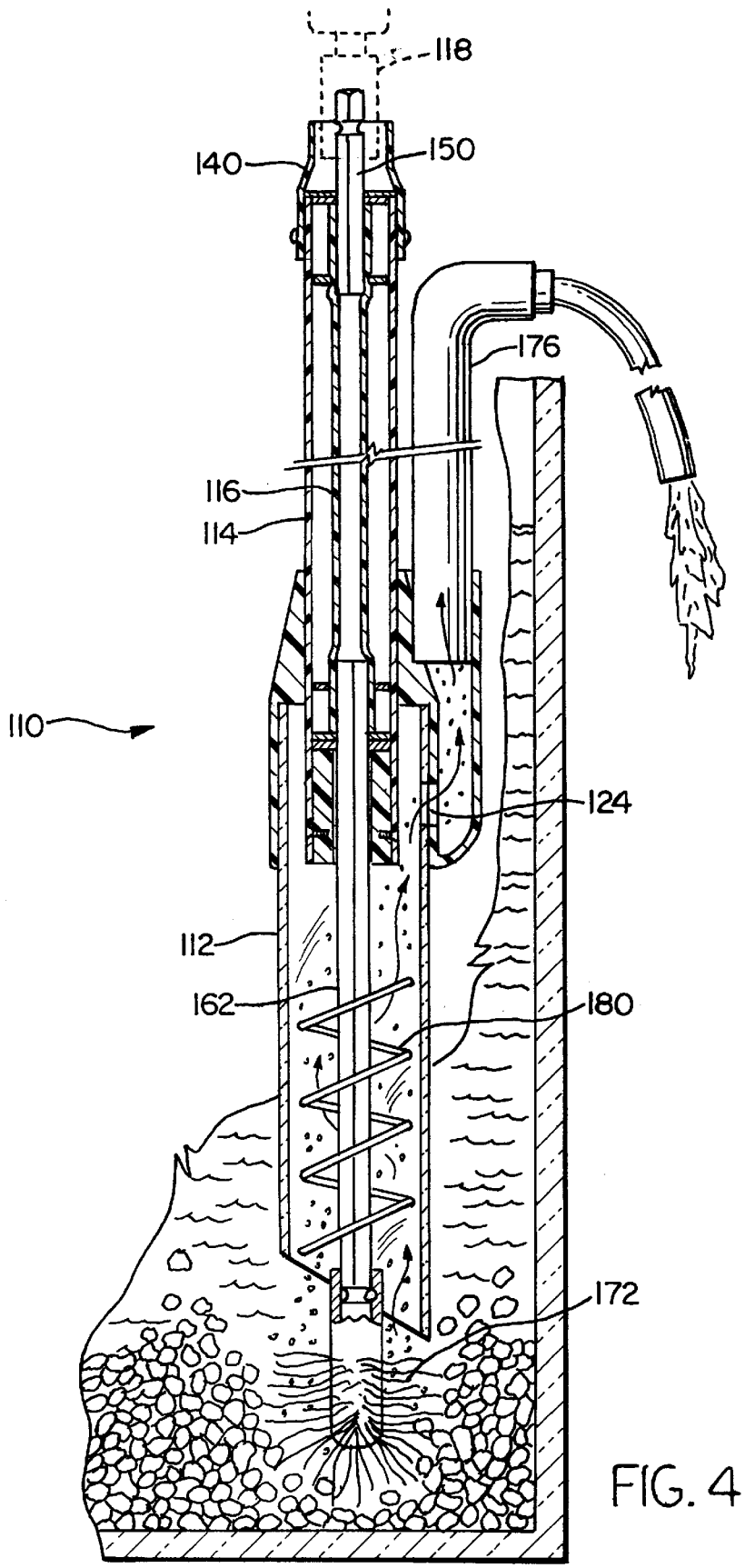
FIG. 4 is a fragmentary elevational view, partly in section, similar to that shown in FIG. 3 but showing a second embodiment of the present aquarium cleaning device being used to clean an aquarium.
Figure 5:
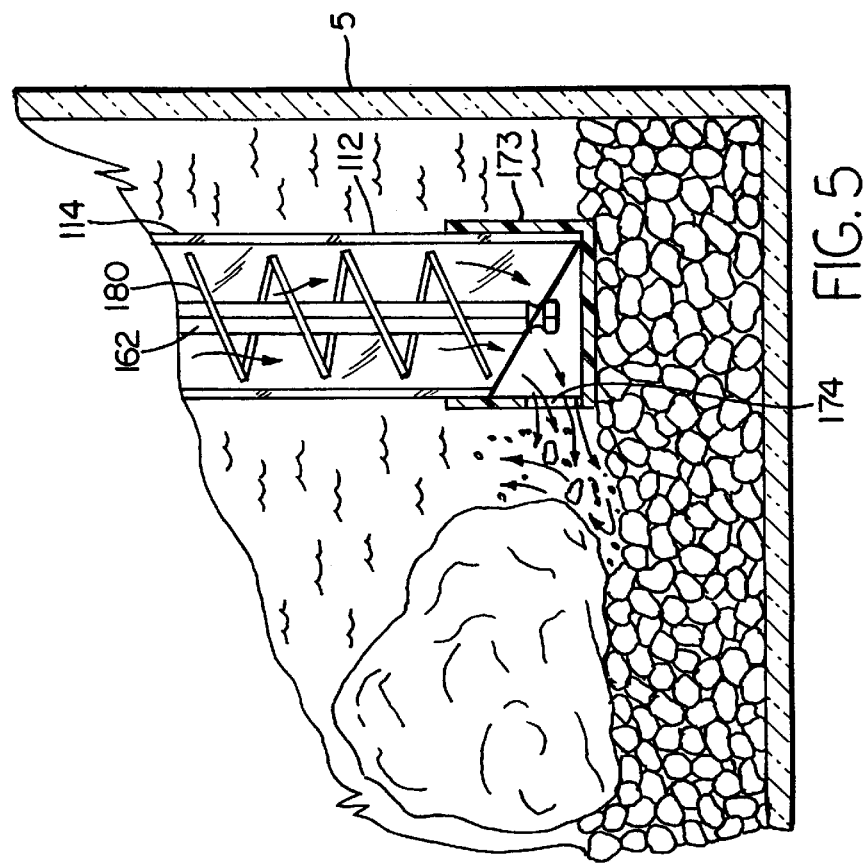
FIG. 5 is a fragmentary elevational view, partly in section, of the embodiment shown in FIG. 4, but with a nozzle attachment that allows the cleaning device to direct a stream of water towards aquarium accessories.

FIG. 4 illustrates a second embodiment for the aquarium cleaning device, in which the elements that are substantially the same as those described above for the embodiment of FIGS. 1 through 3b retain the same reference characters, but increased by 100. Cleaner 110 includes a cylindrical outer housing 112, a cylindrical inner housing 114 and a drive shaft assembly 116 which is disposed within inner housing 114 and which includes a helical impeller 180 attached to the lower end of hexagonal bit 162. Cleaner 110 is adapted to be driven by the rotating chuck assembly 118 of a common hand held cordless screwdriver or similar device (not shown) which attaches to drive bit 150 at the upper end of inner housing 114. Outer housing 112 includes an ejection port or opening 124, which communicates with exhaust tube 176 for drawing contaminated water out of housing 112 and through tube 176 upon actuation of the screw driver (not shown). The brush assembly 172 shown in FIG. 4 may be replaced with the housing 173 shown in FIG. 5. Housing 173 includes an ejection orifice or opening 174, which enables water to be forced out of the interior of housing 112 under pressure upon reversing the direction of rotation of the screw driver. As shown in FIG. 5, when the rotation of the screwdriver is reversed, the impeller 180 forces water within housing 112 downwardly towards the lower end of housing 112 and housing 173. The water is forced through ejection orifice 174 in the desired direction, thus agitating the gravel and dislodging contaminants.

Figure 6:
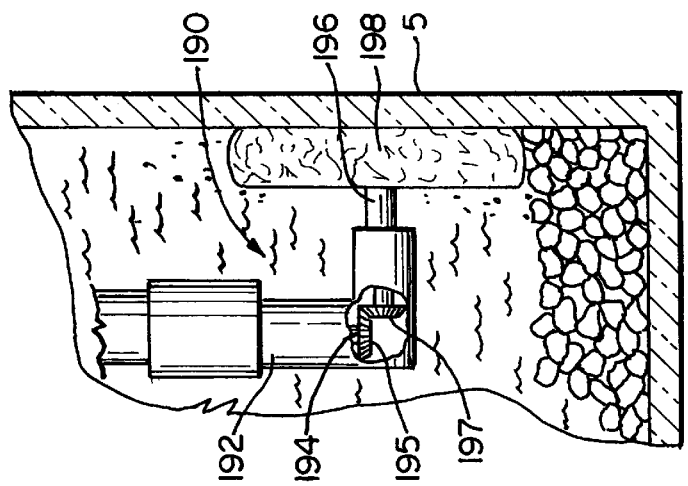
FIG. 6 is a fragmentary elevational view, partly cut away, of a scrub brush attachment for use with either of the above mentioned embodiments.

To clean the sides of the aquarium, the brush 72 may be replaced by the scrubbing pad 198 shown in FIG. 6. Scrubbing pad 198 is shown attached to angled housing 192, which is attached to the lower end of the drive shaft (not shown). Scrubbing pad 198 may be used with either of the embodiments described above. Angled housing 192 includes a pair of rotatable shafts 194, 196 which are oriented at a ninety degree angle relative to each other, with shaft 194 being coaxial with the rotatable drive shaft (not shown). Each shaft 194, 196 includes a helical gear 195, 197 respectively. Scrubbing pad 198 attaches to the end of shaft 196. Accordingly, pad 198 rotates about an axis perpendicular to the axis of the drive shaft (not shown).

It will be appreciated that the foregoing is presented by way of illustration only, and not by way of any limitation, and that various alternative and modifications may be made to the described embodiment without departing from the spirit and scope of the invention.

I claim:

1. Device for removing debris from water tanks including aquariums comprising a tubular housing having an outer wall defining a chamber there within, said housing having an opening in said outer wall for communicating water from said tank into said chamber, a power drive linkage extending from said housing and out of said water tank, a head mounted on said linkage for dislodging debris within the tank, a water removal tube communicating with said chamber and extending out of the water tank for removing water from the chamber and discharging the water from the water tank, whereby removal of water from said chamber when the device is used to remove debris pulls water and debris entrained therein from said tank and into said chamber through said opening for discharge from said chamber through said tube, said drive linkage extending through said opening and said head being mounted on said linkage outside of the chamber.

2. Device for removing debris as claimed in claim 1, wherein said housing has a pair of ends, said drive linkage having a pair of ends, one end of the drive linkage extending through a corresponding end of the housing and holing a connecting member for connecting the drive linkage to a power source.

3. Device for removing debris as claimed in claim 2, wherein the other end of the drive linkage extends through the other end of the housing, and said head is mounted on the portion of the linkage extending from the housing.

4. Device as claimed in claim 2, wherein said drive linkage is a shaft rotatably mounted within said housing, said chamber circumscribing said shaft.

5. Device as claimed in claim 4, wherein said housing has an open end defining said opening, said shaft extending through the open end of the housing.

6. Device as claimed in claim 1, wherein said linkage is a shaft rotatable mounted within said housing, said head being a brush mounted on said shaft.

7. Device as claimed in claim 1, wherein said linkage is a shaft rotatably mounted within said housing, said head being an impeller mounted on said shaft, said impeller being responsive to rotation of the shaft in one direction to draw water.

8. Device for removing debris from water tanks including aquariums comprising a tubular housing having an outer wall defining a chamber therewithin, said housing having an opening in said outer wall for communicating water from said tank into said chamber, a power drive linkage extending from said housing, a head mounted on said linkage for dislodging debris within the tank, a water removal tube communicating with said chamber for removing water from the chamber, whereby removal of water from said chamber when the device is used to remove debris pulls water and debris entrained therein from said tank and said chamber through said opening for discharge from said chamber through said tube, said drive linkage extending through said opening and said head being mounted on said linkage outside of said chamber, said housing including an outer wall and an inner wall defining said chamber therebetween said opening circumscribing the inner wall in said one end of the housing, said inner wall defining an inner housing section of said housing, said drive linkage being a shaft, and means within said inner housing section supporting said shaft for rotation relative to said housing.

9. Device as claimed in claim 8, wherein said tube extends through said outer wall.

10. Device as claimed in claim 8, wherein said inner wall is supported within said outer wall by transversely extending members, one of said members being perforated to permit water to communicate into said chamber through said opening.

11. Device as claimed in claim 8, wherein said housing has a pair of ends, said drive shaft having a pair of ends, one end of the drive shaft extending through a corresponding end of the housing.

12. Device as claimed in claim 11, wherein, one of the ends of the drive shaft extends through one end of the housing, said other end having a connecting member for connection the drive linkage to a portable rotary driving device.

* * * * *

UNITED STATES PATENT AND TRADEMARK OFFICE
CERTIFICATE OF CORRECTION

PATENT NO. : 5,975,022
DATED : November 2, 1999
INVENTOR(S) : Jeffrey S. Miller

It is certified that error appears in the above-identified patent and that said Letters Patent is hereby corrected as shown below:

Claim 1, line 65 - "there within" should be --therewithin--

Claim 2, line 16 - "holing" should be --having--

Claim 6, line 30 - "rotatable" should be --rotatably--.

Claim 7, line 36 - after the word "water" -- into said chamber through said opening and to rotation of the impeller in the opposite direction to force water from the chamber through said opening.--

Claim 12, line 32, delete comma after "wherein"

Signed and Sealed this

Eleventh Day of July, 2000

Attest:

Q. TODD DICKINSON

*Attesting Officer*   *Director of Patents and Trademarks*